United States Patent
Shaffer et al.

(10) Patent No.: US 9,531,782 B2
(45) Date of Patent: Dec. 27, 2016

(54) DYNAMIC MANAGEMENT OF COLLABORATION SESSIONS USING REAL-TIME TEXT ANALYTICS

(71) Applicant: Avaya Inc., Santa Clara, CA (US)

(72) Inventors: Shmuel Shaffer, Palo Alto, CA (US); Seamus Hayes, County Longford (IE); Sheldon Davis, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 273 days.

(21) Appl. No.: 14/303,950

(22) Filed: Jun. 13, 2014

(65) Prior Publication Data

US 2015/0215365 A1  Jul. 30, 2015

Related U.S. Application Data

(60) Provisional application No. 61/933,553, filed on Jan. 30, 2014.

(51) Int. Cl.
*H04L 29/06* (2006.01)
*H04L 12/26* (2006.01)

(52) U.S. Cl.
CPC ............... *H04L 65/80* (2013.01); *H04L 43/04* (2013.01); *H04L 43/08* (2013.01); *H04L 65/403* (2013.01)

(58) Field of Classification Search
CPC ........ H04L 43/04; H04L 43/08; H04L 65/403; H04L 65/80
See application file for complete search history.

(56) References Cited

U.S. PATENT DOCUMENTS

| | | | |
|---|---|---|---|
| 2008/0228574 A1* | 9/2008 | Stewart | G06Q 40/04 705/14.69 |
| 2012/0039460 A1* | 2/2012 | Krishnapuram | H04M 3/51 379/265.07 |
| 2014/0172497 A1* | 6/2014 | Kim | G06Q 10/0635 705/7.28 |
| 2014/0337328 A1* | 11/2014 | Sarvabhotla | G06F 17/30867 707/723 |
| 2015/0016283 A1* | 1/2015 | Lyle | H04L 67/1029 370/252 |

OTHER PUBLICATIONS

Internet Archive; Waybackmachine; http://office.microsoft.com/en-us/communicator-help/rules-HP001172553.aspx.

* cited by examiner

*Primary Examiner* — Paul H Masur

(57) ABSTRACT

System and method to respond to a streaming media link quality problem in a communication session, the method including: monitoring textual messages in the communication session for an indication of a quality of service (QoS) problem; forming a hypothesized cause of the QoS problem; retrieving evidence relevant to the hypothesized cause, the relevant evidence comprising system logs; and determining whether the retrieved evidence supports the hypothesized cause. The system includes: a processor coupled to a memory; a monitoring module configured to monitor textual messages in the communication session for an indication of a quality of service (QoS) problem; an inference module configured to form a hypothesized cause of the QoS problem; a retrieval module configured to retrieve evidence relevant to the hypothesized cause, the relevant evidence comprising system logs stored in the memory; and a calculation module configured to determine whether the retrieved evidence supports the hypothesized cause.

20 Claims, 2 Drawing Sheets

100

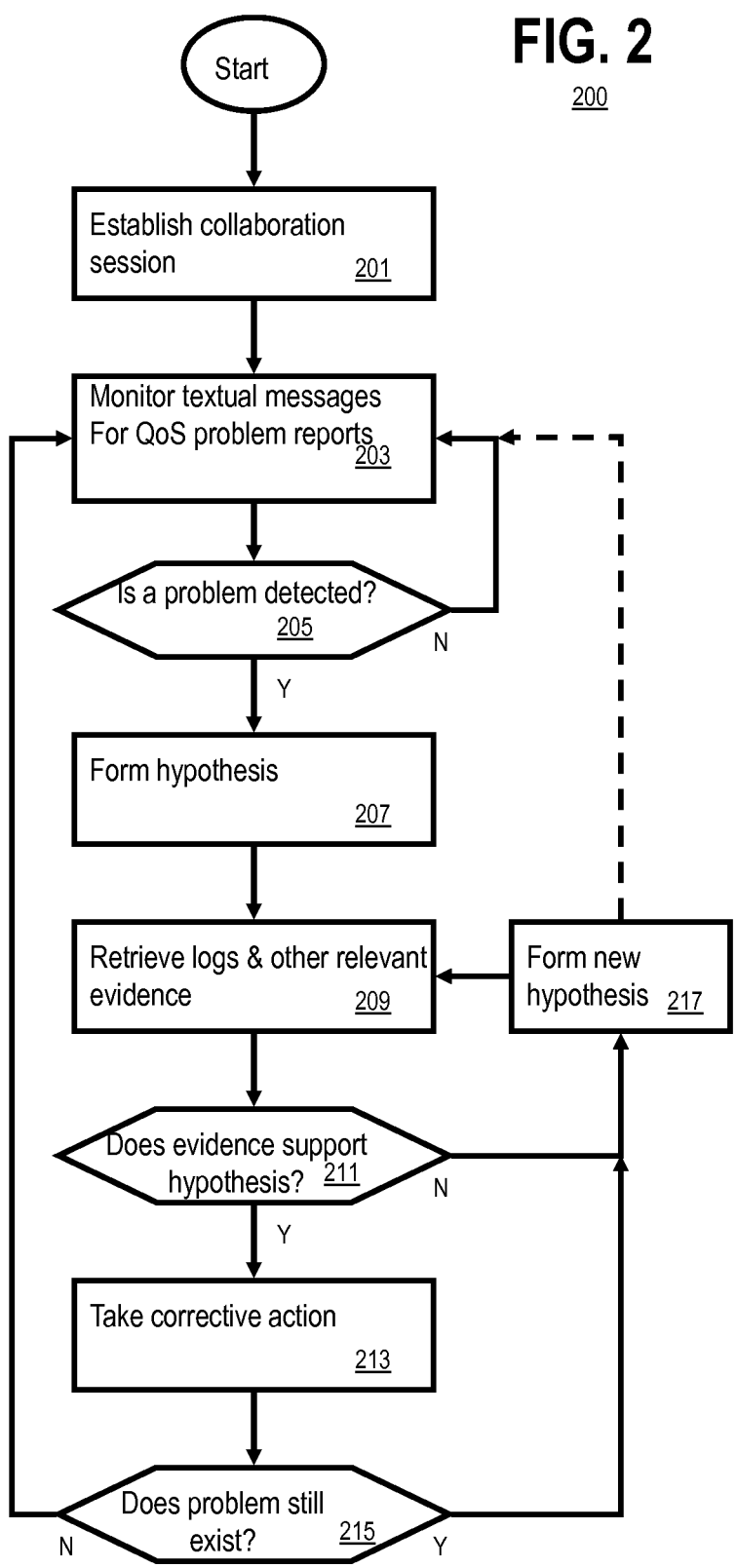

DYNAMIC MANAGEMENT OF COLLABORATION SESSIONS USING REAL-TIME TEXT ANALYTICS

CROSS-REFERENCE TO RELATED APPLICATIONS

This application claims the benefit of U.S. Provisional Patent Application Ser. No. 61/933,553, filed on Jan. 30, 2014, the entire content of which is hereby incorporated by reference in its entirety.

BACKGROUND

Field of the Invention

Embodiments of the present invention generally relate to electronic collaboration sessions, and, in particular, to a system and method for recognizing and diagnosing communication link quality problems using real-time textual analysis of user communications.

Description of Related Art

Electronic collaboration sessions may be conducted by use of collaboration systems such as Avaya Aura Conferencing™ or Avaya Scopia™. The electronic collaboration systems may use a client/server architecture. A good quality connection is important in order to provide to users a communication signal (e.g., audio or video media stream) of sufficient quality, in order to prevent artifacts such as video freezes, skipped frames, dropouts, excessive pixellation, choppiness, or other quality of service problems. Therefore, being able to detect and diagnose problems in the quality of the connection for all conference parties is becoming increasingly important. The root cause of audio and/or video problems may be transient, and therefore are difficult to diagnose. Often, by the time a user reports the problem, the root cause may have cleared. Existing troubleshooting methods may require turning on additional debugging or logging tools and waiting for the next occurrence to happen.

Electronic collaboration sessions often include usage of embedded chat functionality, usually provided as part of the collaboration client, in order to communicate with other parties in the collaboration session. The same chat session is often used to communicate with other participants when a user experiences quality of service problems with the voice or video media stream to or from their telecommunication terminal. For example, a video collaboration user on a low bandwidth network connection may receive chat messages from fellow conference participants informing them that their audio and video quality is poor. With existing collaboration applications, an end user is required to perform manual analysis in order to identify the root cause of a quality of service (QoS) problem. The manual analysis may include, for example, manually checking network utilization or manually capturing relevant log files. The end user is not presented with recommendations to improve the quality of their connection, and the collaboration application does not automatically take corrective action to improve the connection.

Furthermore, log files are maintained for only a limited length of time. By the time that a quality of service problem is encountered and reported to an information technology (IT) department for investigation by a technical support team, the log files often have been overwritten or are no longer available.

Although QoS tagging may be provided in collaboration clients to request sufficient resources and proper services from the network, a shortcoming is that QoS tags are not supported in all networks. Another shortcoming is that QoS tagging does not provide, to the end user of a collaboration client, an automatic or suggested action to improve the quality of the connection. Nor do presently available solutions monitor chat conversations among conference participants in order to automatically diagnose and/or QoS problems.

Therefore, a need exists to provide quicker recognition, diagnosis and corrective action of QoS problems, in order to provide a higher quality communication channel, and ultimately improved customer satisfaction.

SUMMARY

Embodiments of the present invention generally relate to electronic collaboration sessions and, in particular, to a system and method for recognizing and diagnosing and correcting quality problems using real-time textual analysis of user communications.

In one embodiment, a method to respond to a streaming media link quality problem in a communication session includes: monitoring a communication channel used by the communication session, by use of a processor coupled to the communication channel, for presence of textual messages to use as an indication of a quality of service (QoS) problem; forming a hypothesized cause of the QoS problem from the monitored textual messages; retrieving, by a processor coupled to a computer-readable medium, evidence relevant to the hypothesized cause, the relevant evidence comprising system logs stored in the computer-readable medium; and determining whether the retrieved evidence supports the hypothesized cause.

In one embodiment, a system method to respond to a streaming media link quality problem in a communication session includes: a processor coupled to a memory; a monitoring module configured to monitor textual messages in the communication session for an indication of a quality of service (QoS) problem; an inference module configured to form a hypothesized cause of the QoS problem; a retrieval module configured to retrieve evidence relevant to the hypothesized cause, the relevant evidence comprising system logs stored in the memory; and a calculation module configured to determine whether the retrieved evidence supports the hypothesized cause.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 2 illustrates at a high level of abstraction a method in accordance with an embodiment of the present invention.

Figure 1:
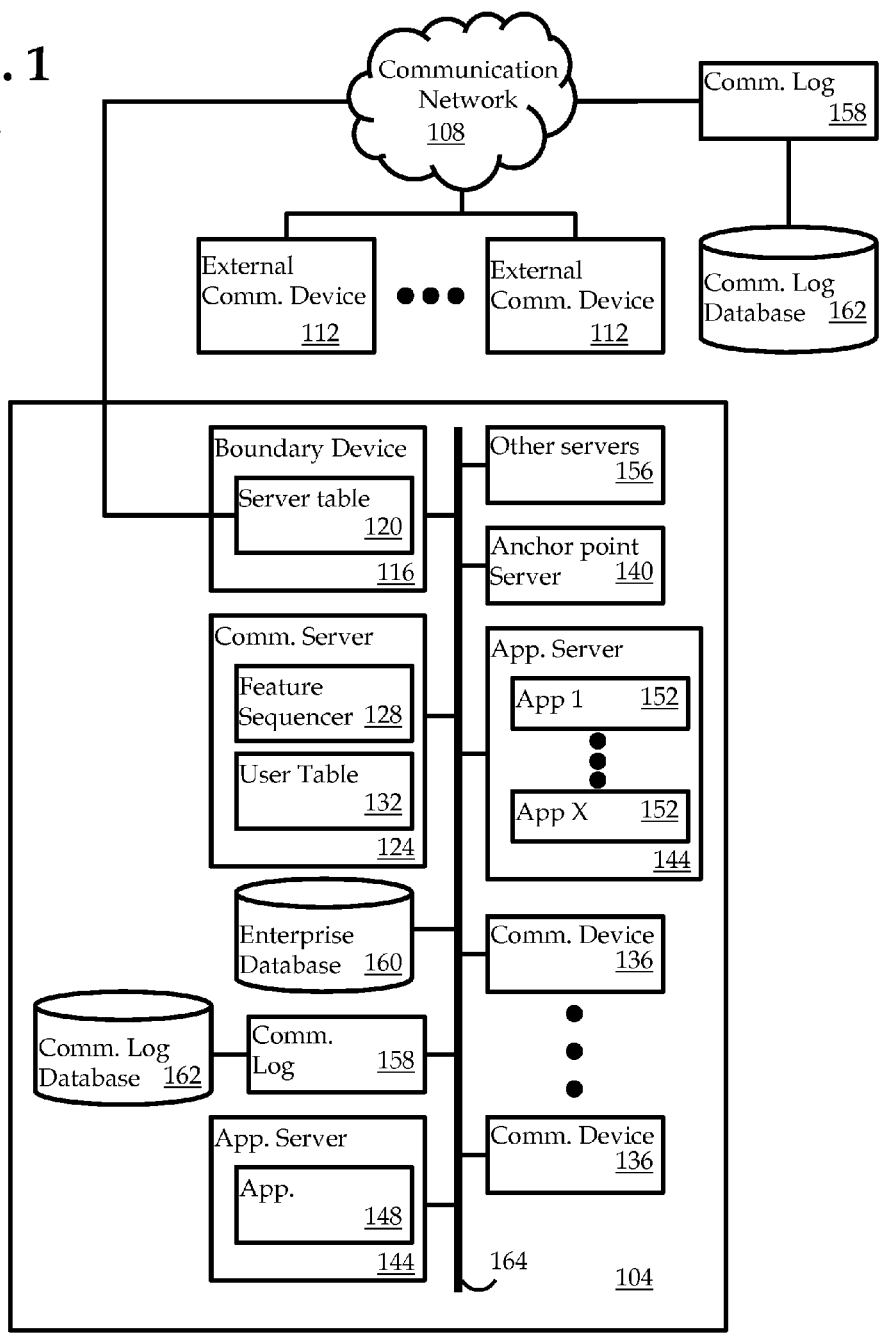
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize automated methods to detect and diagnose quality of service problems associated with an electronic communication session such as an online electronic collaboration system.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "bot" or "robot" as used herein refers to an autonomous daemon or similar software module, that is capable of performing background functions at an operating-system level of a computing system, without the need for control by an application program running under the operating system.

In some embodiments, the bot (e.g., a diagnostic bot) may be an automated participant in a collaboration session. The diagnostic bot may join a collaboration session and may observe and monitor the audio, video, data and chat feed similarly to the way that human participants access these feeds. A diagnostic bots may execute in a co-resident manner with a collaboration client, or the diagnostic bot may execute on a dedicated diagnostic server. Multiple bots may execute on a diagnostic server. A diagnostic server may be co-resident with a collaboration server, or the diagnostic server may be remote from the collaboration server in a separate diagnostic facility that is coupled by a communication link to the collaboration server.

If a collaboration session includes a diagnostic bot, usually there will be only one diagnostic bot executing and supporting the collaboration session. However, in some embodiments, there may be more than one diagnostic bot executing and supporting the collaboration session. For example, if a collaboration session includes participants in the US and in Asia, a US participant may start up a local diagnostic bot in the US and a participant in Asia may start up a local diagnostic bot in their region.

In some embodiments, a system administrator of the collaboration service may define a maximum number of diagnostic bots that are allowed to participate in a collaboration session. In some embodiments, the owner of a virtual meeting room hosting a collaboration session may configure whether a diagnostic bot is present or not present at the start of a collaboration session. If a diagnostic bot is present in a collaboration session, a meeting room owner may configure the location of that bot, i.e., where the diagnostic bot is executing. The meeting room owner may configure whether or not additional participants are able to launch their own diagnostic bots, limited by the maximum number of bots as configured by the system administrator.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Such medium may be local to the processor, or may be remotely located, e.g., as part of a storage-area network. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered user datagram protocol ("UDP") port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112, where N is an integer, N≥1. The external communication device(s) 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

System 100 and its components may be compatible with Session Initiation Protocol (SIP), and may include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 may provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

System 100 of FIG. 1 may be used in a client/server configuration to support an electronic collaboration session. For example, users of a collaboration client running on one or more communication terminals 112 may be communicatively connected via network 108 to a collaboration server such a server 144. Various logs related to client operation (e.g., memory or CPU utilization, hardware or software versions, communication link usage, etc.) may be stored in memory at the respective client terminal. Various logs related to server operation may be monitored by communication logger 158 and stored in a computer-readable medium that is accessible to the server and/or a diagnostic bot, e.g., in database 162 or in a storage-area network (not illustrated in FIG. 1).

Embodiments in accordance with the present disclosure provide an ability to monitor chat exchanges and identify problematic conditions (e.g., service degradations). Upon identification of a problematic condition, embodiments may automatically trigger collection of logs and other relevant information (e.g., by 158) that help diagnose transient conditions. Embodiments may automatically invoke methods for analyzing the logs and other relevant information in light of the problematic conditions, and propose a solution to the end user to address the problematic conditions. Embodiments may also automatically implement the proposed solution to attempt to correct the root cause of the problematic conditions. Thus, by analyzing chat conversations of meeting participants in real-time, collaboration applications that include embodiments in accordance with the present disclosure may automatically initiate log collection, automatically respond to user quality concerns and provide dynamic resolutions to an underlying problematic condition.

Embodiments in accordance with the present disclosure may provide a "diagnostic bot" in order to monitor one or more media streams of a collaborative session for occurrence of a QoS problem, and may attempt to diagnose and/or fix one or more underlying root causes of the QoS problem. The diagnostic bot may analyze QoS, real-time text chat messages, email messages, transcribed spoken messages, and/or metadata associated with chat and/or email messages between participants of a web collaboration session, in order to automatically identify QoS problems being encountered by one or more participants of the collaborative session. This analysis and/or an outcome of this analysis may be referred to as text analytics. System logs and other relevant information may be retrieved in order to diagnose a root cause of the QoS problems.

The diagnostic bot may parse text into words and phrases and, based on the words and phrases it finds in the text, the diagnostic bot may calculate a numeric statistical confidence regarding a root cause of communication problem experienced by the human participants in the collaboration session. In some embodiments, if the statistical confidence is above a predefined threshold value, then the diagnostic bot may be configured to take action corrective action automatically. Based on a result of the analysis, the diagnostic bot may reconfigure the collaboration client to automatically adjust application or operating system settings in order to alleviate the problem, to automatically capture any additional required log files, or to provide an end user with suggested steps in order to resolve the reported QoS problem.

A diagnostic bot in accordance with an embodiment of the present disclosure may include an analysis module built upon commercially available textual mining and analysis technology. Examples of available textual mining and analysis technology include systems (e.g., Avaya Chat 2.0) that monitor web chat conversations in real time and provide automated and suggested answers, based upon a knowledge base. The knowledge base may be stored within enterprise database 160. Embodiments may use the textual mining and analysis technology in electronic collaboration applications to monitor chat conversations between participants in a collaboration session. The diagnostic bot may receive the chat conversations and detect (e.g., search and/or recognize) known phrases or associations of words that are indicative of a problem. Associations of words may include, e.g., adjacency of words, words separated by no more than a configurable number of words, synonyms, colloquialisms, abbreviations, and so forth. Words may include root words and derivatives, such as plurals, tense, related adjectives or adverbs, etc. Examples of phrases may include "you're breaking up", "I can't hear you", "there's a lot of background noise", and so forth.

The textual mining tools used by embodiments are able to use natural language processing (NLP) to interpret messages (e.g., chat or email) in order to detect QoS problems in a manner that is relatively transparent to participants of the electronic collaboration session. NLP is known as the ability of a computer program to understand human speech as it is spoken. As part of NLP, a confidence score may be calculated, which represents a relative certainty or probability that the meaning estimated or determined by the textual mining tools agrees with the actual meaning intended by the human user.

When the diagnostic bot detects a known or suspected phrase or associations of words, the diagnostic bot may initiate (e.g., spawn) an analytic processor-implemented process to diagnose and to resolve the QoS problem, or to present a suggested resolution to relevant or affected conference party participants. The suggested resolution may include, e.g., steps that the relevant or affected conference party participants can take to help alleviate a problem (e.g., change a manner of speaking, put a telecommunication terminal on/off mute, pausing a download or other concurrent process), or to acknowledge to the relevant or affected participants that a problem has been detected and is being resolved.

Embodiments in accordance with the present disclosure may be further illustrated by reference to a usage scenario. The usage scenario below is not limiting but rather exemplary, and other usage scenarios are contemplated. The usage scenario is useful for a multi-party video collaboration session. The usage scenario begins by assuming that user "A" is actively communicating on a streaming media connection to other collaboration participants. At the same time, user A is sending an email with a large attachment, by use of an email client that shares a communication link with the streaming media connection. While the email client is sending the outgoing email, the audio and/or video quality of the streaming media may degrade, for example if the available capacity on the streaming media connection is limited, or if user A's communication terminal is CPU-limited or memory-limited, etc. In response to the degraded streaming media, other participants on the conference may send public and/or private chat messages to user A or otherwise comment as part of the collaboration session to indicate the poor streaming media quality. For example, another participant may inform user A via a chat message that user A's audio or video has become choppy, or a second participant may ask a third participant if they are also experiencing problems with the streaming media from user A.

Next in the usage scenario, a text analysis engine may capture the chat message in real-time and initiate a diagnostic bot to automatically diagnose the problem referred to in the chat messages. The diagnostic bot may query the operating system to learn what applications are consuming resources such as network bandwidth. The diagnostic bot notifies user A that poor audio and video quality is being experienced by other participants, and that the likely cause is that the email client application is exhausting a resource such as network bandwidth, CPU cycles, terminal memory, etc., and that corrective action is required. The collaboration client may also capture evidence of resource usage such as log files, records of CPU usage, memory usage, bandwidth usage, and other evidence, and automatically provides the evidence to a collaboration server for further analysis. The diagnostic bot may also recommend corrective action to user A such as suspending or cancelling the email transfer. The diagnostic bot may notify some or all of the meeting participants that user A's communication terminal is sending a large email, and that the degradation in streaming media quality is temporary.

Embodiments in accordance with the present disclosure may capture and analyze system logs responsively to the type or symptoms of a QoS problem detected from user communications. The diagnostic bot may provide advice based at least in part on analysis of system logs that are judged to be most relevant to a hypothesized cause of the QoS problem. For example, a QoS problem may arise (e.g., choppiness) in which there may be more than one root cause (e.g., bandwidth limitations, or shortage of available memory, or high CPU utilization caused by competing processes). Embodiments may examine system logs from a communication terminal involved with a QoS problem to determine first, e.g., whether or not the CPU utilization exceeded a predetermined threshold. If a system log of CPU utilization correlates in time with reported QoS problems, then the first hypothesis may be that the CPU is overloaded, and a first relevant recommendation may be to terminate some background processes. If following the first recommendation cures the QoS problem, then the analysis and/or system logs may be discarded if necessary in order to save disk space. If following the first recommendation did not cure the QoS problem, then the next hypothesis may be explored and tested by examining the relevant system logs for that hypothesis.

Resource exhaustion is not the only root cause of a degradation to a streaming media. For example, software incompatibilities may also degrade streaming media. Such incompatibilities may include obsolete versions of client software used by some users, misconfiguration of configurable settings of client software (e.g., permission levels, network connectivity settings, cache settings), and so forth. The diagnostic bot may be configured to detect degradations caused by misconfigurations.

In some embodiments, the system may automatically take a corrective measure. For example, if the system determines that a first process (e.g., an email client that is sending a large email) is unacceptably affecting the quality of another process (e.g., a streaming media), the system may temporarily reduce the amount of system resources that the first process is allowed to use, thus freeing up those resources for usage by the second process, up to and including suspension of the first process until the second process does not need as much system resources. The system resources reduced from the first process should be usable by the second process to alleviate the problem. As a counterexample, if a streaming media process is suffering degraded quality due to insufficient available memory, then decreasing the communication bandwidth allocated to an email client may not directly alleviate the problem unless the decrease results in less memory used by the email client and therefore such a corrective action would not be recommended.

In some embodiments, the system may spawn a process to find a network path that the voice and/or video media stream traverses, and to start collecting traces and/or logs from routers through which the streaming media traverses. If the embodiment finds a bottleneck in the network over the route traversed, the embodiment may trigger software defined network (SDN) commands and automatically provision additional bandwidth for the connection at links where a bottleneck exist.

In some embodiments, a diagnostic bot may be a silent or invisible participant in the electronic collaboration session until it is needed or until it contacts a user with a recommendation in order to address a QoS problem. Such operation causes minimal distraction to participants of the collaboration session.

In some embodiments, human participants in the chat conference may be aware of the presence of the diagnostic bot, and/or may be able to address the diagnostic bot. A diagnostic bot may be identified in the collaboration session as an active participant in a chat conference. User queries then may be addressed directly to the diagnostic bot in order to troubleshoot problems or provide knowledge base answers. For example, a name for one or more diagnostic bots in the collaboration session may appear in a list of participants in the collaboration session, for example "Diagnostic Bot 1—New York," "Diagnostic Bot 2—Tokyo," and so forth. Participants in the session may be able to address comments to the diagnostic bots in a similar manner to the way they address comments to other session participants. For example, in a chat window, a line of text may be sent to all participants or it may be sent privately to a single participant. In such embodiments, the diagnostic bot may provide on-help functionality for the collaboration system. The diagnostic bot may be invoked by entering a predetermined keyword or phrase in a chat message (e.g., "bot!"). In some embodiments, the diagnostic bot may be listed in a list of contacts that a user can select to chat with.

In some embodiments, a diagnostic bot may be configured in advance for an electronic conference that has not yet started, e.g., in order to test the communication link in advance.

In some embodiments, when the diagnostic bot is an active participant in a chat conference, keywords or phrases that are directed to the bot may be received by the bot, while at the same time the keywords or phrases are not displayed to at least some human chat participants, e.g., not displayed to other human chat not affected by the degradation in streaming media quality, or not displayed to all other human chat participants. In other embodiments, all other human participants may see commands directed to the bot.

In some embodiments, if a second human chat participant attempts to invoke a second bot while a first bot invoked by a first human chat participant is already executing, the first bot may handle the problem reported by the second human chat participant.

FIG. 2 illustrates at a high level of abstraction a method 200 in accordance with an embodiment of the invention. Method 200 begins at step 201, at which an electronic collaboration session is established, by a collaboration server such as server 144, among a plurality of users of external communication devices 112 that have requested to participate or were invited to participate.

Next, control of method 200 transitions to step 203, at which textual messages in the electronic collaboration session are monitored for reports or indications of QoS problems. Examples of QoS problems, and examples of reports of such problems, have been described above. Monitoring may be carried out by usage of a child process (e.g., a diagnostic bot) that may be spawned. The diagnostic bot may support at least three modes of operation, as described in reference to this step and to step 213: (1) automatic mode; (2) collaborative mode; and (3) debug mode.

Automatic mode of monitoring may be by way of natural language processing of the textual messages. Voice communications may be automatically transcribed by way of voice recognition processes, and the resulting transcription treated as a textual message. The textual messages may be chat, email, transcribed speech, etc. Corrective action may be determined and implemented automatically.

In collaborative mode of operation, embodiments may communicate with a human user who initiated the bot (e.g., a session moderator or a participant). The diagnostic bot in collaborative mode informs the human user e.g., via private text message, if the diagnostic bot has detected a problem that exceeds a configurable threshold, and may seek confirmation from the human user regarding the root cause of the problem. If the diagnostic bot determines an appropriate corrective action, the diagnostic bot may inform the human user who initiated the bot what the corrective action is, and may ask the human user for authorization to proceed. After the diagnostic bot takes the corrective action, the diagnostic bot may ask the human user whether the problem is fixed. If the human user replies that the problem is fixed, the diagnostic bot may return to monitor mode. However, if the human user indicates that the problem is not fixed, the diagnostic bot may ask the human user whether he or she wants the diagnostic bot to undo the corrective action. Whether or not the corrective action is undone, the diagnostic bot may ask the person if he or she wants the diagnostic bot to suggest another corrective action.

In debug mode, the diagnostic bot informs the human user of all actions that the diagnostic bot is taking as the diagnostic bot does it.

Next, control of method 200 transitions to decision step 205, at which a decision is made whether reports or indications of a QoS problem has been detected in the textual messages of step 203. If the result of decision step is negative, then control of method 200 transitions back to step 203 at which monitoring continues. In this way, steps 203 and 205 form a continuous monitoring loop. If the result of decision step is positive, then control of method 200 transitions to step 207. Other control structures may be used to achieve similar outcomes, such as an interrupt service routine that invokes step 207 if reports or indications of a QoS problem has been detected.

Next, at step 207, a hypothesis is formed regarding a possible root cause of the QoS problem referred to in the reports or indications from step 203. If more than one hypothesis is possible, then in some embodiments the most likely remaining hypothesis may be selected. A hypothesis is remaining if it has not been ruled out as a possible root cause. Likelihood may be determined on the basis of historical reports. If there is no historical data to rely upon, then a hypothesis may be selected on a predetermined order of preference (e.g., first consider bandwidth problem, second consider CPU overload, etc.).

Next, control of method 200 transitions to step 209, at which logs and/or other evidence relevant to the hypothesis from step 207 is retrieved, e.g., by the diagnostic bot. Additional processes may be spawned as necessary, e.g., to analyze network problems.

Next, control of method 200 transitions to decision step 211, at which a decision is made whether the evidence gathered at step 209 supports the hypothesis from step 207. If the result of decision step is negative, then control of process 200 transitions to step 217. If the result of decision step is positive, then control of process 200 transitions to step 213.

For example, if the current hypothesis is bandwidth contention, step 209 may retrieve logs and other evidence related to bandwidth usage. If the evidence shows only one application attempting to use bandwidth, then the current hypothesis is not well supported, and control of process 200 would pass to step 217. However, if instead the evidence showed more than one application attempting to use bandwidth concurrently with reports of QoS problems, then the evidence supports the current hypothesis and control of process 200 would pass to step 213.

At step 217, a new hypothesis is selected for further investigation if available, and control of method 200 would pass to step 209. If no further hypotheses are available, then process 200 may determine that it is unable to resolve the QoS problem at this time, and then control of method 200 would pass to step 203.

At step 213, corrective action based upon the current hypothesis optionally may be taken automatically. Embodiments may be in one of several operating modes when taking corrective action, including at least: (1) automatic mode; (2) collaborative mode; and (3) debug mode. As described above in connection with step 205, in automatic mode, corrective action may be determined and implemented automatically. In collaborative mode of operation, embodiments may communicate with a human user who initiated the bot, and may work more closely with the human user to identify, resolve, and verify the problem. In debug mode, the diagnostic bot informs the human user of all actions that the diagnostic bot is taking as the diagnostic bot does it. Determining and implementing corrective action in debug mode may proceed similarly to either automatic mode or collaborative mode. Control of method 200 then passes to decision step 215. If corrective action is not taken automatically, then the corrective action may be presented to the user for review and further action.

At decision step 215, a decision is made whether the QoS problem has been sufficiently improved by the corrective action. A desirable outcome from the perspective of the electronic collaboration users is that the QoS problem has been eliminated, or has been reduced in magnitude below a configurable threshold that may represent, e.g., a user tolerance. A less desirable outcome is that the QoS problem has been reduced, but not to a level that is satisfactory to the electronic collaboration users. A still less desirable outcome is that the QoS problem is substantially unaffected by the corrective action. An unacceptable outcome is that the QoS problem has been made worse by the corrective action. The decision may be made by inference from natural language processing of textual messages that would indicate whether the QoS problem still exists (e.g., "still can't hear you"), or whether the QoS problem has been resolved (e.g., "that's better" or "sounds good now"). In some embodiments, the decision whether the corrective action was sufficiently helpful may be determined by feedback that is solicited from a user, e.g., by asking whether the problem has been fixed.

In some embodiments, the decision whether a problem has been fixed may also be made based upon quantifiable measurements that may be available. For example, QoS indicators, CPU utilization and/or memory utilization percentage may be useful.

If the result of decision step 215 is positive, then control of method 200 transitions to step 217. If the result of decision step 215 is negative, then the QoS may be considered to be solved and control of method 200 transitions to step 203.

Embodiments of the present invention include a system having one or more processing units coupled to one or more memories. The one or more memories may be configured to store software that, when executed by the one or more processing unit, allows practice of embodiments described herein, at least by use of processes described herein, including at least in FIG. 2, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any" of followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to respond to a streaming media link quality problem in a communication session, comprising:
   monitoring a communication channel used by the communication session, by use of a processor coupled to the communication channel, for presence of textual messages to use as an indication of a quality of service (QoS) problem;
   forming a hypothesized cause of the QoS problem from the monitored textual messages;
   retrieving, by the processor coupled to a computer-readable medium, evidence relevant to the hypothesized cause, the relevant evidence comprising system logs stored in the computer-readable medium;
   determining whether the retrieved evidence supports the hypothesized cause; and
   when the retrieved evidence supports the hypothesized cause, taking corrective action based on the hypothesized cause.

2. The method of claim 1, the step of wherein taking corrective action based upon the hypothesized cause comprises automatically taking corrective action by the processor.

3. The method of claim 1, further comprising:
   suggesting corrective action to an affected user based upon the hypothesized cause; and
   asking the user for authorization to take the corrective action.

4. The method of claim 1, further comprising the step of spawning a diagnostic process to monitor textual messages.

5. The method of claim 4, wherein the diagnostic process is invisible to users of the communication session.

6. The method of claim 4, wherein the diagnostic process is addressable by users of the communication session.

7. The method of claim 1, wherein the textual messages comprise at least one of chat messages or transcribed speech.

8. The method of claim 1, wherein the step of monitoring textual messages comprises monitoring by use of natural language processing (NLP).

9. The method of claim 1, further comprising:
   determining whether the corrective action improved the QoS problem.

10. The method of claim 9, further comprising:
    when the corrective action did not improve the QoS problem, then forming a second hypothesized cause of the QoS problem; and
    applying a second corrective action based upon the second hypothesized cause.

11. The method of claim 1, wherein forming a hypothesized cause of the QoS problem comprises: consulting a knowledge base related to QoS problems; and determining a confidence score associated with the hypothesized cause.

12. The method of claim 1, further comprising the step of spawning a diagnostic process to collect logs from routers through which the streaming media traverses; and triggering software defined network (SDN) commands to provision additional bandwidth for a connection at links where a bottleneck exists.

13. A system to respond to a streaming media link quality problem in a communication session, comprising:
    a processor coupled to a memory, wherein the processor executes instructions stored in memory to;

monitor textual messages in the communication session for an indication of a quality of service (QoS) problem;

form a hypothesized cause of the QoS problem;

retrieve evidence relevant to the hypothesized cause, the relevant evidence comprising system logs stored in the memory;

determine whether the retrieved evidence supports the hypothesized cause; and when the retrieved evidence supports the hypothesized cause, take corrective action based on the hypothesized cause.

14. The system of claim 13, wherein the processor automatically takes corrective action based on the hypothesized cause.

15. The system of claim 13, wherein the processor suggests corrective action to an affected user based upon the hypothesized cause, and asks the user for authorization to take the corrective action.

16. The system of claim 13, wherein the processor spawns a diagnostic process to monitor textual messages.

17. The system of claim 13, wherein the textual messages comprise at least one of chat messages or transcribed speech.

18. The system of claim 13, wherein the processor:
determines whether the corrective action improved the QoS problem.

19. The system of claim 18, when the corrective action did not improve the QoS problem, then the processor:
forms a second hypothesized cause of the QoS problem; and
applies a second corrective action based upon the second hypothesized cause.

20. The system of claim 13, wherein the processor:
consults a knowledge base related to QoS problems; and
determines a confidence score associated with the hypothesized cause.

* * * * *

UNITED STATES PATENT AND TRADEMARK OFFICE
CERTIFICATE OF CORRECTION

| | | |
|---|---|---|
| PATENT NO. | : 9,531,782 B2 | Page 1 of 1 |
| APPLICATION NO. | : 14/303950 | |
| DATED | : December 27, 2016 | |
| INVENTOR(S) | : Shmuel Shaffer, Seamus Hayes and Sheldon Davis | |

It is certified that error appears in the above-identified patent and that said Letters Patent is hereby corrected as shown below:

In the Claims

Column 16, Line 25, "2. The method of claim 1, the step of wherein taking" should read --2. The method of claim 1, wherein taking--

Signed and Sealed this
Twenty-third Day of May, 2017

Michelle K. Lee
*Director of the United States Patent and Trademark Office*